(12) United States Patent  (10) Patent No.: US 7,443,423 B2
Yokonuma  (45) Date of Patent: Oct. 28, 2008

(54) ELECTRONIC CAMERA

(75) Inventor: Norikazu Yokonuma, Tokyo (JP)

(73) Assignee: Nikon Corporation, Tokyo (JP)

( * ) Notice: Subject to any disclaimer, the term of this patent is extended or adjusted under 35 U.S.C. 154(b) by 634 days.

(21) Appl. No.: 10/515,224

(22) PCT Filed: May 27, 2003

(86) PCT No.: PCT/JP03/06602

§ 371 (c)(1),
(2), (4) Date: Nov. 22, 2004

(87) PCT Pub. No.: WO03/101090

PCT Pub. Date: Dec. 4, 2003

(65) Prior Publication Data

US 2005/0151870 A1 Jul. 14, 2005

(30) Foreign Application Priority Data

May 28, 2002 (JP) .............................. 2002154004

(51) Int. Cl.
H04N 5/225 (2006.01)
(52) U.S. Cl. ............. 348/220.1; 348/222.1; 348/333.01
(58) Field of Classification Search ................
348/333.01–333.13
See application file for complete search history.

(56) References Cited

U.S. PATENT DOCUMENTS 6,020,920 A    2/2000  Anderson
6,137,534 A *  10/2000 Anderson ................. 348/222.1
6,359,649 B1   3/2002  Suzuki
6,563,535 B1 * 5/2003  Anderson ................. 348/231.2
7,102,686 B1 * 9/2006  Orimoto et al. ............. 348/375
2001/0012065 A1  8/2001 Ejima et al.
2001/0013902 A1* 8/2001 Kawabe ...................... 348/358
2002/0051643 A1* 5/2002 Nakashita ................... 396/429
2003/0128282 A1* 7/2003 Sudo ........................ 348/222.1

FOREIGN PATENT DOCUMENTS

JP    A 2002-513539    5/2002

* cited by examiner

Primary Examiner—NgocYen T. Vu
Assistant Examiner—Cynthia Calderon
(74) Attorney, Agent, or Firm—Oliff & Berridge, PLC

(57) ABSTRACT

An object of the invention is to provide an electronic camera that can properly display a moving image usable as a viewfinder. The electronic camera of the invention includes: an image pickup section photographing an object for image generation; a display device displaying the image generated by the image pickup section as a moving image; a buffer section; a recording section; and a display switching section. The buffer section temporarily stores the image generated by the image pickup section and to be displayed as a moving image on the display device. The recording section records the image generated by the image pickup section according to a user's operation. The display switching section switch, at predetermined timing, a first display for display of a moving image on the display device through the buffer section, and a second display for display of a moving image not through the buffer section.

7 Claims, 7 Drawing Sheets

ELECTRONIC CAMERA

CROSS REFERENCE TO RELATED APPLICATION

This application is based upon and claims the benefit of priority from Japanese Patent Application No. 2002-154004, filed on May 28, 2002, the entire contents of which are incorporated herein by reference.

TECHNICAL FIELD

The present invention relates to an electronic camera having a display device.

TECHNOLOGICAL BACKGROUND

There have been conventional electronic cameras having a function of displaying, on a display device, a moving image that can be used as a viewfinder. Among these electronic cameras, a type of camera is known, in which the following two different buffers, two for each, are provided for driving an internal image sensor, an internal display device, and the like in response to a video synchronizing signal (hereinafter, referred to as a V-signal).

One type is a buffer used for temporarily storing data of a moving image generated by the image sensor or the like (hereinafter, referred to as a buffer for photographed image). The other type is a buffer used for temporarily storing data of a moving image to be displayed on the display device (hereinafter, referred to as a buffer for display image).

In such an electronic camera, while moving image data is being stored into one buffer for photographed image in response to a V-signal, the moving image data that has been stored in the other buffer for photographed image in response to the previous V-signal is transferred to one buffer for display image. Similarly, while the moving image data is being transferred to one buffer for display image, the moving image data that has been stored in the other buffer for display image in response to the previous V-signal is displayed on the display device.

To display a moving image by use of the buffers for photographed image and for display image, however, the time for three cycles of the V-signal is required from when the image sensor begins to generate image signals associated with the moving image data until the image signals are displayed on the display device as a moving image. Accordingly, a moving image displayed on the display device is always the image of an object that occurred three cycles of the V-signal earlier.

Therefore, when the user takes a picture, seeing not an object but a moving image, it is hardly possible to release the shutter at the right moment due to the above-described delay of displaying the moving image.

DISCLOSURE OF THE INVENTION

An object of the present invention is to provide an electronic camera that can properly display a moving image usable as a viewfinder.

Hereinafter, claims of the invention will be described on an item-by-item basis.

(1) An electronic camera of the invention includes an image pickup section, a display device, a buffer section, a recording section, and a display switching section. The image pickup section photographs an object to generate an image. The display device displays the image generated by the image pickup section as a moving image. The buffer section temporarily stores therein the image generated by the image pickup section and to be displayed as a moving image on the display device. The recording section records thereon the image generated by the image pickup section according to a user's operation. The display switching section switches, at a predetermined timing, a first display for display of a moving image on the display device through the buffer section, and a second display for display of a moving image not through the buffer section.

(2) The electronic camera of the invention may preferably have the following features. First, the camera includes an operating member which receives in two steps a user's operation associated with the image recording by the recording section. Second, the camera includes a shooting condition adjusting section which performs at least either auto exposure adjustment or autofocus until the operating member is pressed in a first step. Third, the display switching section performs the first display until the operating member is pressed in the first step, and switches the first display to the second display when the operating member is pressed in the first step.

(3) The electronic camera of the invention may preferably have the following features. First, the camera includes an exposure adjusting section which performs auto exposure adjustment. Second, the camera includes an operating member which receives a user's operation to stop the auto exposure adjustment. Third, the display switching section performs the first display until the user's operation to stop the auto exposure adjustment is received by the operating member, and switches the first display to the second display when the user's operation to stop the auto exposure adjustment is received.

(4) Further, the electronic camera of the invention may preferably have the following features. First, the camera includes a focusing section which performs autofocus. Second, the camera includes an operating member which receives a user's operation to stop the autofocus. Third, the display switching section performs the first display until the user's operation to stop the autofocus is received by the operating member, and switches the first display to the second display when the user's operation to stop the autofocus is received.

(5) Further, the electronic camera of the invention may preferably have the following features. First, the camera includes an exposure adjusting section which performs auto exposure adjustment. Second, the camera includes a focusing section which performs autofocus. Third, the camera includes an operating member which receives a user's operation to stop the auto exposure adjustment and autofocus. Fourth, the display switching section performs the first display until the user's operation to stop the auto exposure adjustment and autofocus is received by the operating member, and switches the first display to the second display when the user's operation to stop the auto exposure adjustment and autofocus is received.

(6) Further, the electronic camera of the invention may preferably have the following feature that the display switching section decides whether or not to enable the second display according to the user's operation.

The objects and features of the invention will become more apparent from the following detailed description when read in conjunction with the accompanying drawings.

BEST MODE FOR CARRYING OUT THE INVENTION

Embodiments of the invention will now be described with reference to the drawings.

Structure of the Embodiment

Figure 1:
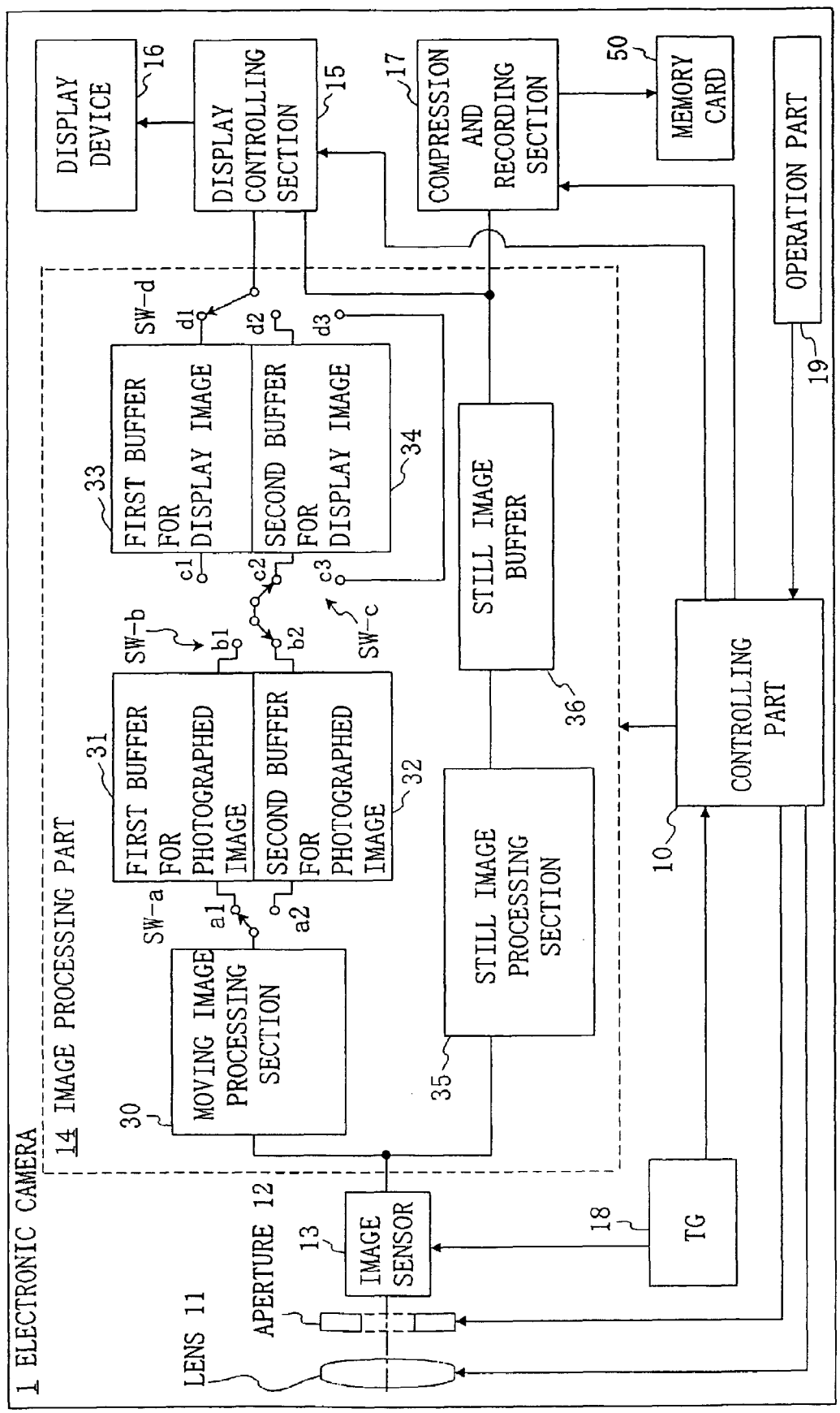
FIG. 1 is a functional block diagram of an electronic camera according to the present invention.

FIG. 1 is a functional block diagram of an electronic camera according to the present invention. As shown, the electronic camera 1 includes a controlling section 10, a lens 11, an aperture 12, an image sensor 13, an image processing section 14, a display controlling section 15, a display device 16, a compressing/recording section 17, a TG (timing generator) 18, and an operation section 19. The image processing section 14 includes a moving image processing section 30, a switch SW-a, a first buffer for photographed image 31, a second buffer for photographed image 32, a switch SW-b, a switch SW-c, a first buffer for display image 33, a second buffer for display image 34, a switch SW-d, a still image processing section 35, and a still image buffer 36.

The controlling section 10 controls the system of the electronic camera 1 as described below.

First, the controlling section 10 is connected through a lens driving section (not shown) to the lens 11, and performs AF (autofocus) on the basis of the data supplied from an AF sensor (not shown) or the like.

Second, the controlling section 10 is connected through an aperture driving section (not shown) to the aperture 12, and performs AE (auto exposure adjustment) on the basis of the data supplied from a photometry section (not shown) or the like.

Third, the controlling section 10 is connected to each section within the image processing section 14, the display controlling section 15, the compressing/recording section 17, the TG 18, and the operation section 19, and inputs various control signals such as the V-signal output from the TG 18 to each section to control the driving timings and the like for the image processing section 14, the display controlling section 15, and the compressing/recording section 17.

Forth, the controlling section 10 constantly monitors the states of switches constituting the operation section 19. The switches (not shown) may include, for example, a power supply switch, a release button that can be depressed in two steps by a half-press and full-press, an AE/AF lock switch used for forcibly locking the AE and AF, and switches used for changing various modes.

The image sensor 13 is connected to the TG 18, and is driven in accordance with various control signals output from the TG 18 to supply the image processing section 14 with image signals generated based on light incident through the lens 11 and the aperture 12.

The moving image processing section 30 in the image processing section 14 performs various image processing for a moving image on the image signals supplied from the image sensor 13 to generate the moving image data. The generated moving image data is stored through the switch SW-a into the first buffer for photographed image 31 or the second buffer for photographed image 32. The moving image data is then stored through the switches SW-b and SW-c into the first buffer for display image 33 or the second buffer for display image 34, after which the data is supplied to the display controlling section 15 via the switch SW-d. Alternatively, after the moving image data has been stored into the first buffer for photographed image 31 or the second buffer for photographed image 32, the data is directly supplied to the display controlling section 15 via the switches SW-b, SW-c (position c3 thereof), and SW-d.

The still image processing section 35 in the image processing section 14 performs various image processing for a still image on the image signals supplied from the image sensor 13 to generate the still image data. The generated still image data is supplied through the still image buffer 36 to the display controlling section 15 and the compressing/recording section 17.

The display controlling section 15 converts the moving image data and still image data, both supplied as described above, to display data to be displayed on the display device 16.

The compressing/recording section 17 compresses the still image data supplied as described above and converts it to record data to be stored into a memory card 50 (removable memory card).

Description of Operations in Embodiment

To simplify the description below, four terms are defined as follows.

First, a series of processes is referred to as moving image capturing process, in which moving image data is generated by the moving image processing section 30 by using the image signals generated by the image sensor 13, to store the generated moving image data through the switch SW-a into the first buffer for photographed image 31 or the second buffer for photographed image 32.

Second, a process in which the moving image data stored in the first buffer for photographed image 31 or the second buffer for photographed image 32 is transferred to and stored into the first buffer for display image 33 or the second buffer for display image 34 via the switches SW-b and SW-c is referred to as transmittal between buffers.

Third, a process in which the moving image data stored in the first buffer for display image 33 or the second buffer for display image 34 is supplied to the display controlling section 15 via the switch SW-d and then displayed on the display device 16 is referred to as moving image displaying process. Similarly, a process in which the moving image data stored in the first buffer for photographed image 31 or second buffer for photographed image 32 is supplied through the switches SW-b, SW-c (position c3 thereof), and SW-d to the display controlling section 15 and then displayed on the display device 16 is also referred to as moving image displaying process.

Fourth, a series of processes is referred to as still image recording process, in which the still image data is generated by the still image processing section 35 by using the image signals generated by the image sensor 13 and the generated still image data is supplied through the still image buffer 36 to the compressing/recording section 17 and then stored into the memory card 50. The still image recording process may include a process in which the still image data is supplied to the display controlling section 15 and then displayed on the display device 16.

Figure 2:
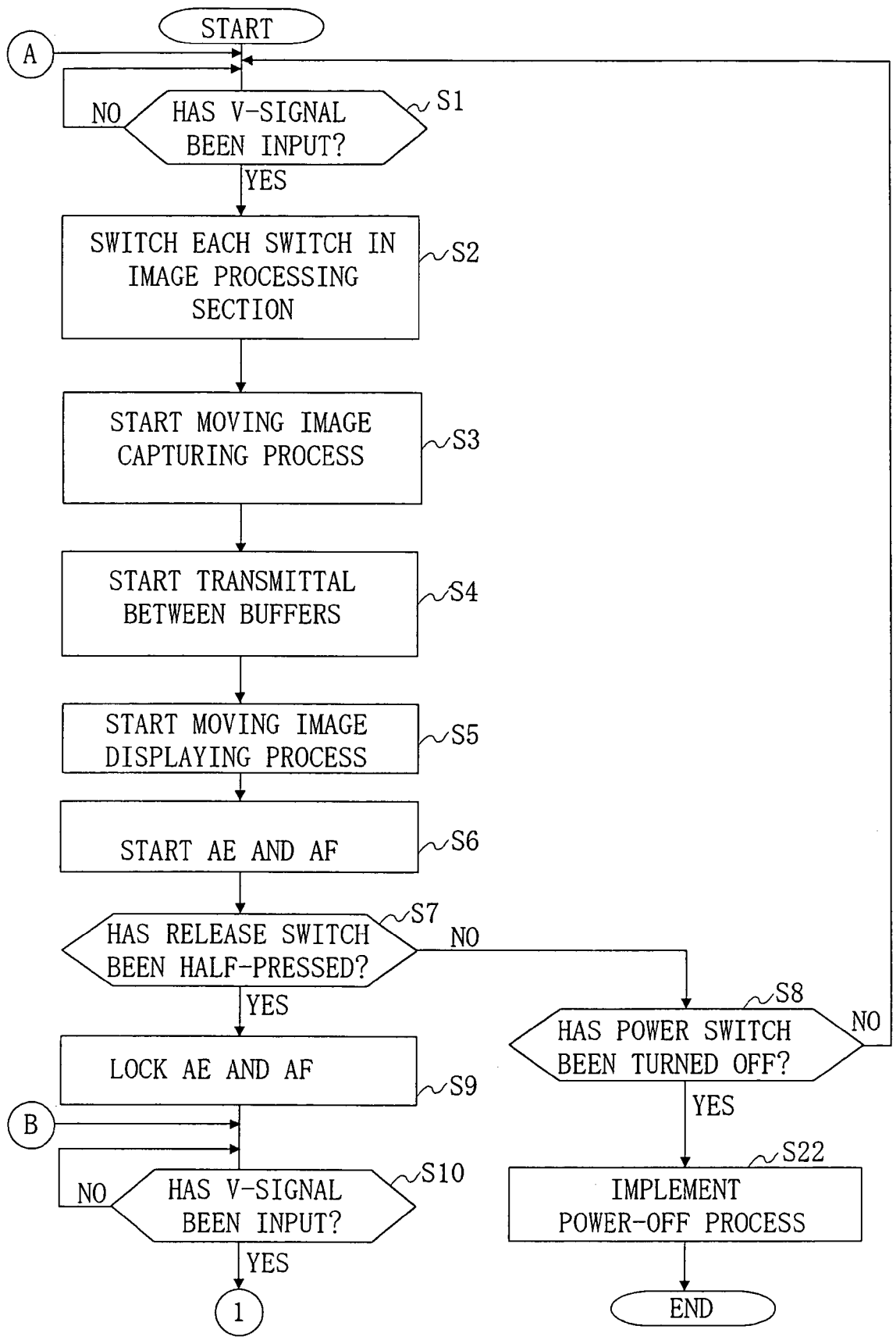
FIG. 2 is a flowchart of the operation of the electronic camera according to the invention.
Figure 3:
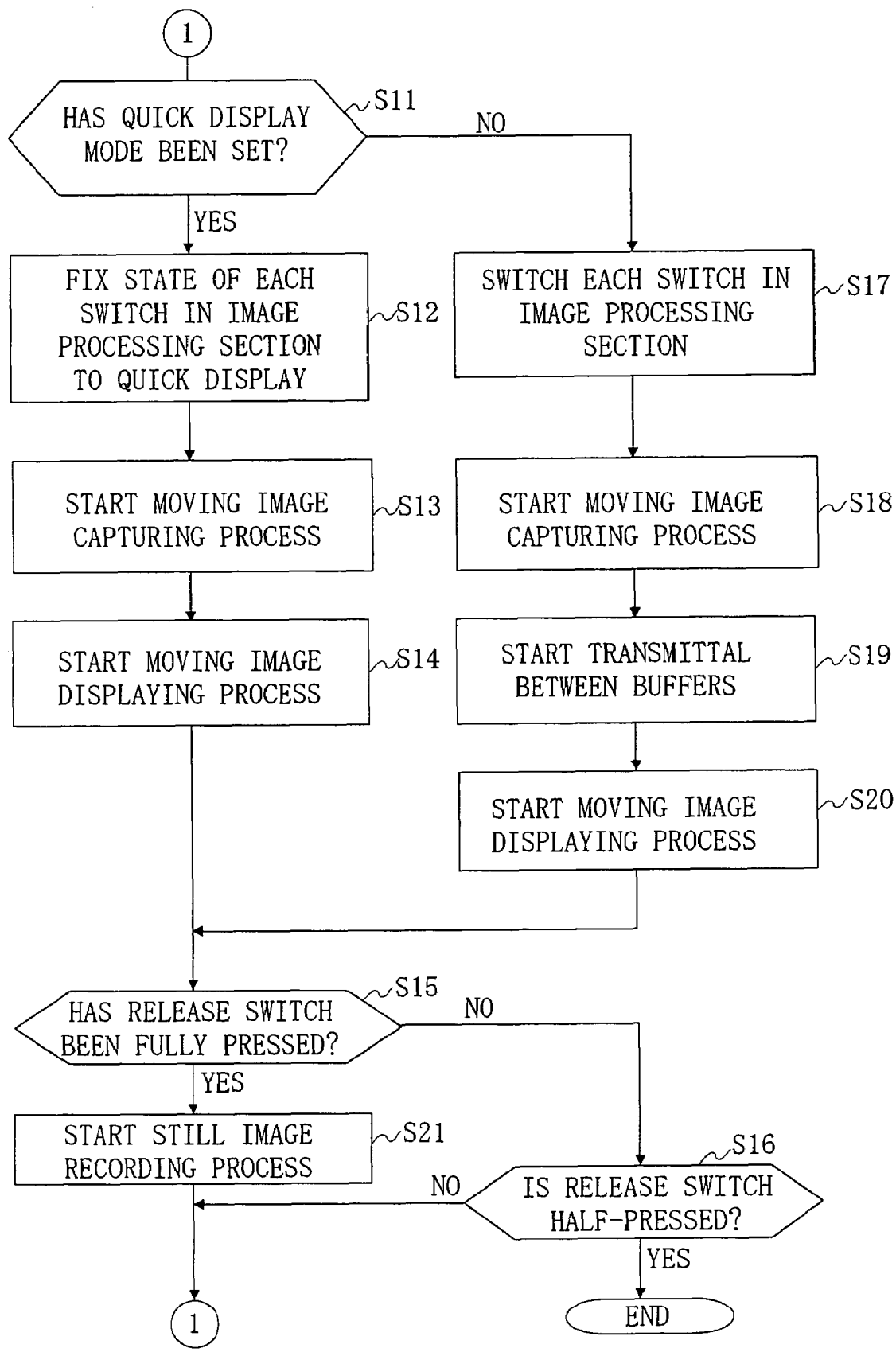
FIG. 3 is a flowchart of the operation of the electronic camera according to the invention.

FIG. 2 and FIG. 3 are flowcharts of the operation of the above-described electronic camera, and more particularly, showing the operation of the controlling section 10 after the power supply switch has been turned on by a user. Referring to FIG. 1, the operation of the electronic camera 1 will be described in order of the step numbers shown in FIG. 2 and FIG. 3.

[Step S1]

The controlling section 10 decides whether a V-signal is input or not. The controlling section 10 repeats the operation in step S1 until a V-signal is input, and proceeds to the operation in step S2 when the V-signal is input.

[Step S2]

The controlling section 10 switches the state of each switch in the image processing section 14 as follows.

First, immediately after the power supply switch is turned on, the controlling section 10 closes the switch SW-a to the position a1, switch SW-b to the b2, switch SW-c to the c2, and switch SW-d to the d1. Subsequently, when a new V-signal is input, the controlling section 10 changes the position of the switch SW-a to the position a2, switch SW-b to the b1, switch SW-c to the c1, and switch SW-d to the d2. After that, when a new V-signal is input again, the controlling section 10 changes the position of the switch SW-a to the position a1, switch SW-b to the b2, switch SW-c to the c2, and switch SW-d to the d1.

In sum, switching the state of each switch in the image processing section 14 is to switch from/to one state (hereinafter, referred to as a first state) to/from the other state (hereinafter, referred to as a second state). The one state is a state in which the switch SW-a is closed to the position a1, switch SW-b to the b2, switch SW-c to the c2, and switch SW-d to the d1. The other state is a state in which the switch SW-a is closed to the position a2, switch SW-b to the b1, switch SW-c to the c1, and switch SW-d to the d2.

[Step S3]

The controlling section 10 starts the moving image capturing process.

[Step S4]

The controlling section 10 starts the transmittal between buffers.

[Step S5]

The controlling section 10 starts the moving image displaying process.

[Step S6]

The controlling section 10 starts performing the AE and AF.

[Step S7]

The controlling section 10 decides whether the release button is half-pressed or not. When the release button is half-pressed, the controlling section 10 proceeds to the operation in step S9. Otherwise, the controlling section 10 proceeds to the operation in step S8.

[Step S8]

The controlling section 10 decides whether the power supply switch is turned off or not. When the power supply switch is turned off, the controlling section 10 proceeds to the operation in step S22. Otherwise, the controlling section 10 returns to the operation in step S1.

Accordingly, while the power supply switch is in the on state, the operations in steps S1 to S8 are repeated until the release button is half-pressed.

Figure 4:
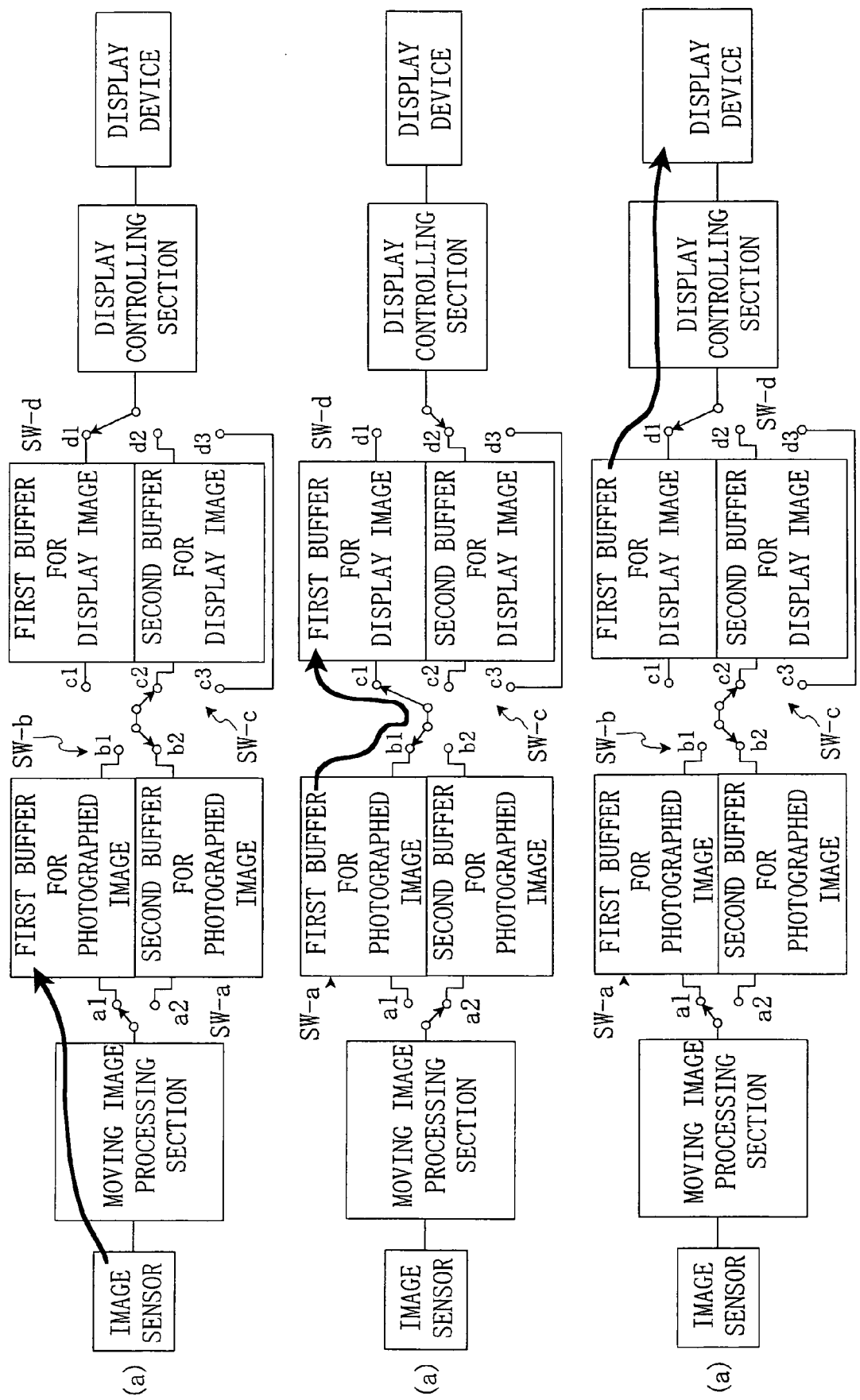
FIG. 4 is a drawing describing a normal display.

As a result, for example, when the switches in the image processing section 14 are switched to the first state as shown in FIG. 4(*a*), newly generated moving image data is stored into the first buffer for photographed image 31 as shown by a thick line in the drawing. In addition, the moving image data already stored in the second buffer for photographed image 32 is transferred to the second buffer for display image 34, and the moving image data already stored in the first buffer for display image 33 is displayed on the display device 16 through the display controlling section 15.

When a new V-signal is input again and the switches in the image processing section 14 are switched to the second state as shown in FIG. 4(*b*), the moving image data which has been stored in the first buffer for photographed image 31 in FIG. 4(*a*) is transferred to the first buffer for display image 33 as shown by a thick line in FIG. 4(*b*). In addition, newly generated moving image data is stored into the second buffer for photographed image 32 and the moving image data already stored in the second buffer for display image 34 is displayed through the display controlling section 15 on the display device 16.

Further, When a new V-signal is input again and the switches in the image processing section 14 are switched to the first state as shown in FIG. 4(*c*), the moving image data which has been stored in the first buffer for display image 33 in FIG. 4(*b*) is displayed through the display controlling section 15 on the display device 16 as shown by a thick line in FIG. 4(*c*). In addition, newly generated moving image data is stored into the first buffer for photographed image 31, and the moving image data which has been stored in the second buffer for photographed image 32 in FIG. 4(*b*) is transferred to the second buffer for display image 34.

Consequently, in the process in which the operations in steps S1 to S8 are repeated, displaying is performed while the operations of the image sensor 13 and display device 16 are exactly synchronized each other. In this process, the moving image data stored into the first buffer for photographed image 31 or the second buffer for photographed image 32 in the moving image capturing process is displayed, delaying from the start of the data storage to the first buffer for photographed image 31 or the second buffer for photographed image 32 by two cycles of the V-signal. This delay corresponds to three cycles of the V-signal as in the conventional electronic camera if measured from a point at which the image sensor 13 starts generating image signals associated with the moving image data. Hereinafter, this type of display, which is the same as in the conventional electronic camera, is referred to as normal display.

[Step S9]

This step follows step S7 when the release button has been half-pressed in step S7.

In this step, the controlling section 10 locks the AE and AF.

[Step S10]

The controlling section 10 decides whether a V-signal is input or not. The controlling section 10 repeats the operation in step S10 until a V-signal is input, and proceeds to the operation in step S11 in FIG. 3 when the V-signal is input.

[Step S11]

The controlling section 10 decides whether the user has set a mode that makes a quick display (described in detail later) valid in advance. When the mode that makes a quick display valid has been set, the controlling section 10 proceeds to the operation in step S12; otherwise, the controlling section 10 proceeds to the operation in step S17.

[Step S12]

The controlling section 10 fixes the state of each switch in the image processing section 14 to the state for the quick display. That is, the controlling section 10 fixes the switch SW-a to the position a1, switch SW-b to the b1, switch SW-c to the c3, and switch SW-d to the d3.

[Step S13]

The controlling section 10 starts the moving image capturing process.

[Step S14]

Figure 5:
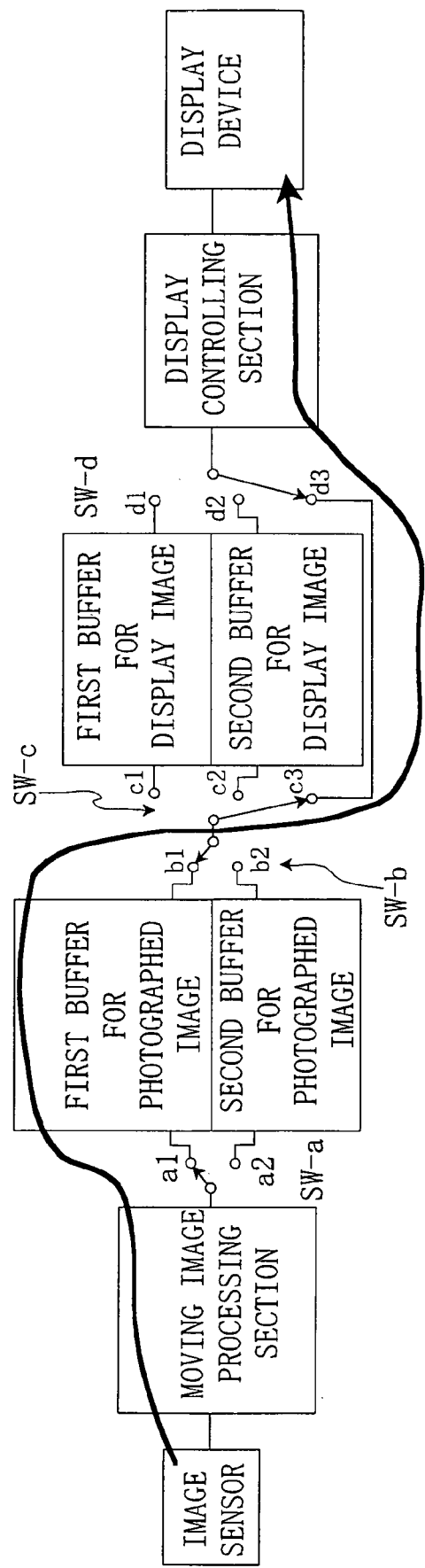
FIG. 5 is a drawing describing a quick display.

The controlling section 10 starts the moving image displaying process. Thus, when each switch in the image processing section 14 is fixed to the state for the quick display as described above, the moving image data stored in the first buffer for photographed image 31 is directly supplied to the display controlling section 15 without passing through the first buffer for display image 33 as shown by a thick line in FIG. 5.

Moving image data newly stored in the first buffer for photographed image 31 in the moving image capturing process can thus be displayed on the display device more quickly than the normal display. Hereinafter, this type of display is referred to as quick display.

[Step S15]

The controlling section 10 decides whether the release button is full-pressed or not.

When the release button is full-pressed, the controlling section 10 proceeds to the operation in step S21; otherwise, the controlling section 10 proceeds to the operation in step S16.

[Step S16]

The controlling section 10 decides whether the release button is half-pressed or not. When the release button is half-pressed, the controlling section 10 returns to the operation in step S10; otherwise (that is, when the press of the release button is released), the controlling section 10 returns to the operation in step S1.

Accordingly, while a mode in which the quick display is enabled is set, the operations in steps S10 to S16 are repeated to carry out continuous quick display as long as the release button is half-pressed.

[Step S17]

This step follows step S11 if the quick display mode is disabled. The controlling section 10 changes the state of each switch in the image processing section 14 as in step S2.

[Step S18]

The controlling section 10 starts the moving image capturing process as in step S3.

[Step S19]

The controlling section 10 starts the transmittal between buffers as in step S4.

[Step S20]

The controlling section 10 starts the moving image displaying process as in step S5 and then proceeds to the operation in step S15. Accordingly, when the quick display mode is disabled, the operations in steps S10, S11, S17 to S20, S15, and S16 are repeated to carry out the continuous normal display as long as the release button is half-pressed.

[Step S21]

This step follows step S15 if the release button has been full-pressed in step SIS.

The controlling section 10 starts the still image recording process and then returns to the operation in step S1. Accordingly, the operations after step 1 are repeated when the release button is full-pressed to perform the still image recording process or when the press of the release button is released as described above.

[Step S22]

This step follows step S8 if the power supply switch has been turned off in step S8. The controlling section 10 performs a predetermined power off process and the operation of the controlling section 10 terminates.

The operation of the embodiment has been described above.

EFFECTS OF THE EMBODIMENT

According to the present embodiment, for using the moving image to determine an image composition of an object, such as before half-pressing the release button, the user can choose the normal display (steps S3 to S5), placing importance on a synchronization.

In another case, for using the moving image to determine a shooting timing (full-pressing the release button), such as while half-pressing the release button, the user can choose the quick display (steps S12 to S14), placing importance on a response feature. The normal display and the quick display can thus be switched from each other appropriately depending on the features. Therefore, according to the embodiment, the user can release the shutter at the right moment.

SUPPLEMENTAL ITEMS OF EMBODIMENTS

In the embodiment, an example has been described in which, when the quick display mode has been enabled, the normal display is switched to the quick display if the release switch is half-pressed. The invention, however, is not limited to this embodiment.

Figure 6:
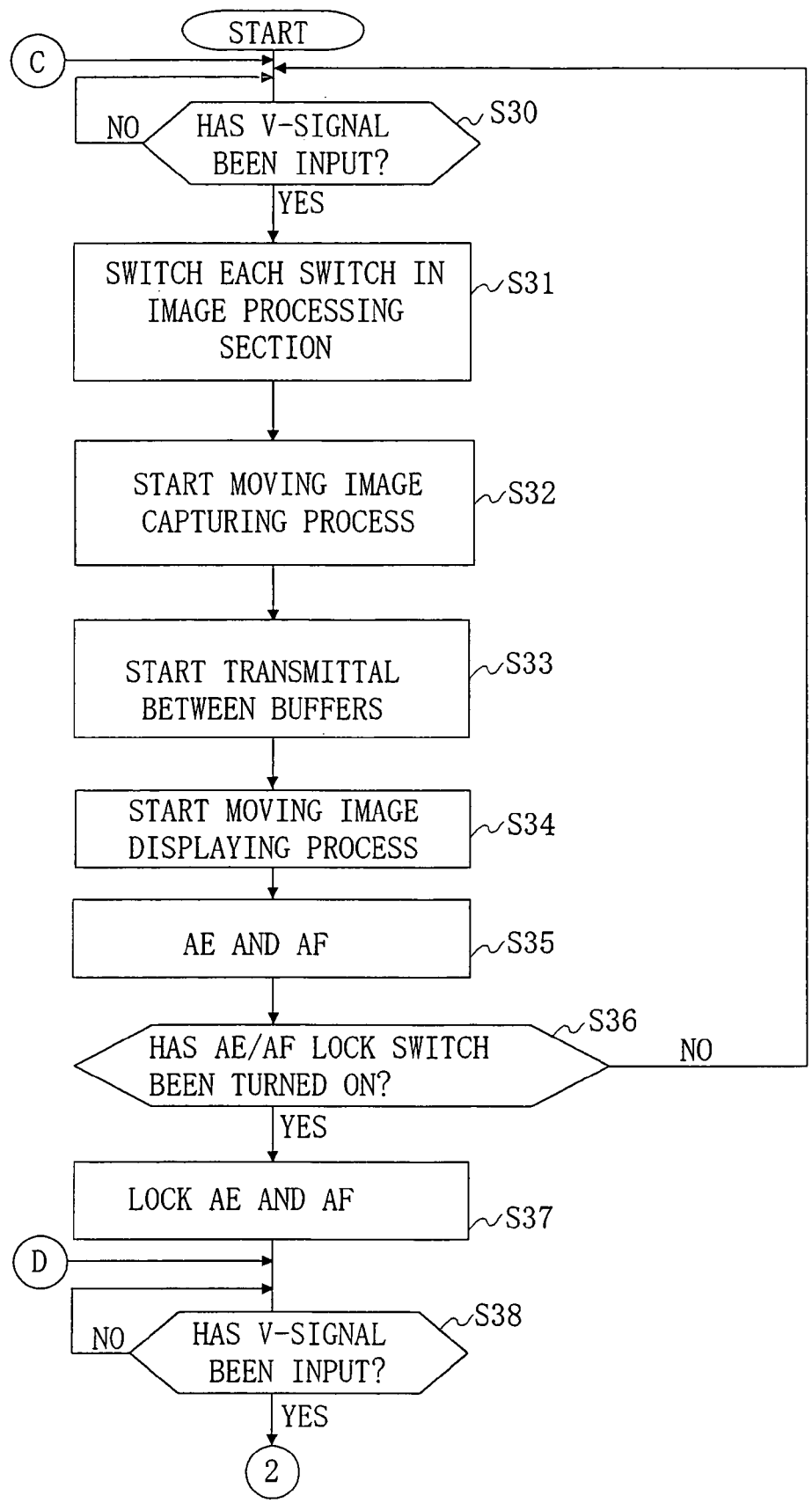
FIG. 6 is a flowchart of the operation of an electronic camera corresponding to another embodiment according to the invention.
Figure 7:
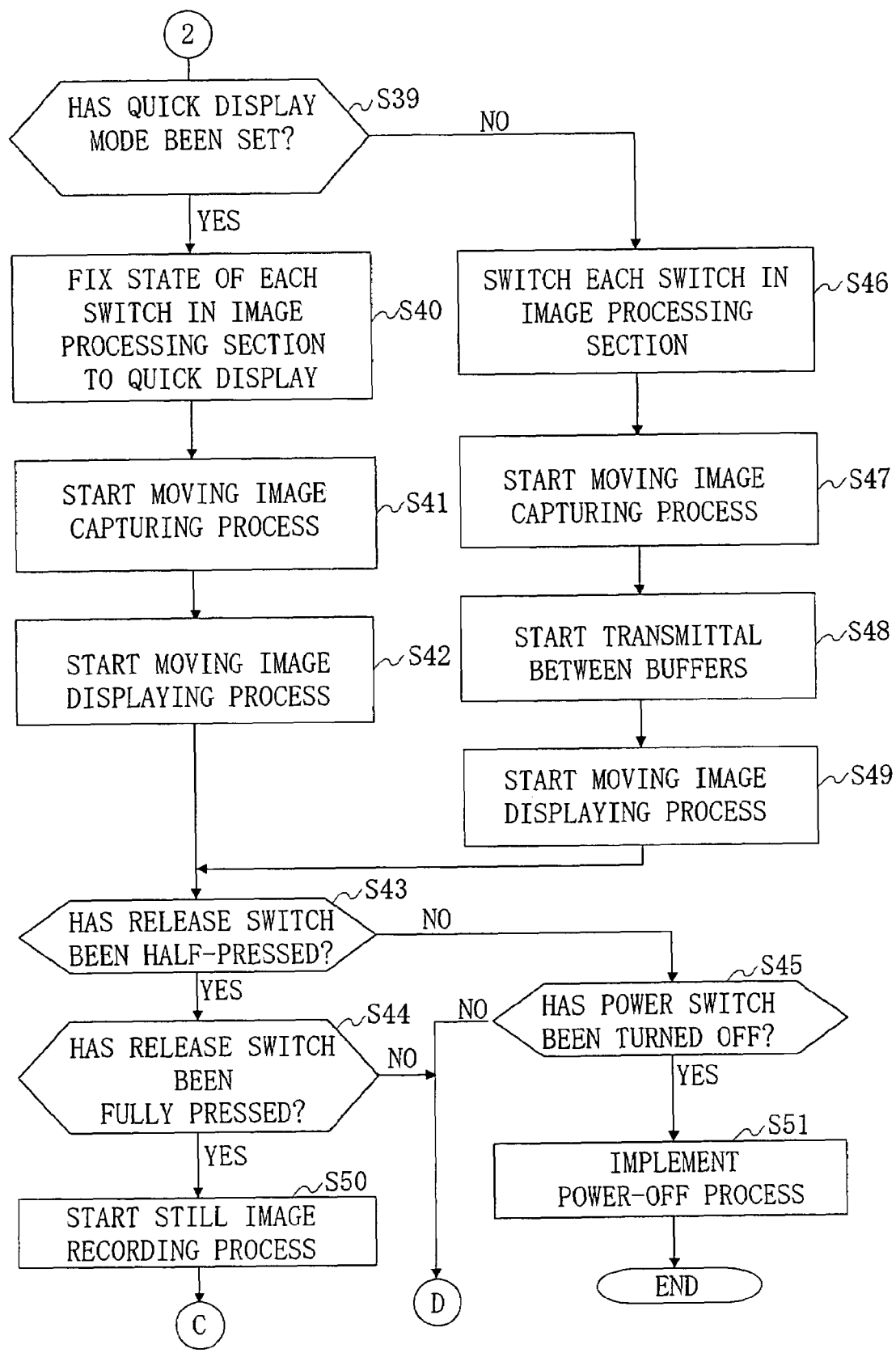
FIG. 7 is a flowchart of the operation of the electronic camera corresponding to the another embodiment according to the invention.

As shown in FIG. 6 and FIG. 7, regardless of whether the release button is half-pressed or not, this switching may also be performed when the AE/AF lock switch is turned on.

Another example shown in FIG. 6 and FIG. 7 will be briefly described below. Repeated descriptions of the above-described embodiment will be omitted here.

The controlling section 10 repeats the operations in steps S30 to S36 in FIG. 6 to perform the normal display until the AE/AF lock switch is turned on. When the AE/AF lock switch is turned on, then the controlling section 10 locks the AE/AF function (step S37 in FIG. 6).

When the mode in which quick display is enabled is set in step S39, the operations in steps S38 in FIG. 6 to S45 in FIG. 7 are repeated to perform the quick display until the release button is full-pressed.

When the mode in which quick display is not enabled is set in step S39, on the other hand, the controlling section 10 repeats the operations in step S38 in FIG. 6 and in steps S39, S46 to S49, and S43 to S45 in FIG. 7 to perform the normal display.

When the release button is full-pressed while the quick or normal display is performed after the AE/AF lock switch has been turned on, the controlling section 10 performs the still image recording process (step S50 in FIG. 7); when the power supply switch is turned off, the controlling section 10 performs a power off process (step S51 in FIG. 7).

Consequently, while the AE/AF lock switch is turned off, that is, it is likely that the user is using a moving image to determine an image composition of an object, he/she can choose the normal display, placing importance on a synchronization. While the AE/AF lock switch is turned on, that is, it is likely that the user is using a moving image to determine a shooting timing, he/she can choose the quick display, placing importance on a response feature. Therefore, in this embodiment, the same effects as in the above-described embodiment can also be obtained.

RELATIONSHIP BETWEEN THE EMOBODIMENT AND THE CLAIMS

Finally, relationship between the embodiment and the claims will be described. The following is an exemplary interpretation and does not limit the invention.

A buffer section described in the claims corresponds to the first and second buffers for display image 33 and 34.

A recording section described in the claims corresponds to the compressing/recording section 17.

A display switching section described in the claims corresponds to a function of the controlling section 10 that switches the states of the switches SW-a, SW-b, SW-c, and SW-d.

A first display described in the claims corresponds to the normal display.

A second display described in the claims corresponds to the quick display.

An operating member and the operating member being pressed in the first step both described in the claims correspond to a release button and the release button being half-pressed, respectively.

The phrase "predetermined timing" in the claims corresponds to a timing immediately after the release button is half-pressed (when the mode in which quick display is enabled).

A shooting condition adjusting section described in Claim 2 corresponds to a function of the controlling section 10 that performs the AE and AF in step S6.

The descriptions "user's operation to stop the auto exposure adjustment" in Claim 3, "user's operation to stop the autofocus" in Claim 4, and "user's operation to stop the auto exposure adjustment and the autofocus" in Claim 5 correspond to the release button being half-pressed (when the mode in which quick display is enabled).

The description "it is decided according to the user's operation whether or not to enable the second display" in Claim 6 corresponds to "a function of the controlling section 10 that decides whether the user has set a mode that makes a quick display valid in advance and proceeds to the operation in step S12 or S17 depending on the decision" (see step S11).

The invention is not limited to the above embodiments and various modifications may be made without departing from the spirit and scope of the invention. Any improvement may be made in part or all of the components.

INDUSTRIAL AVAILABILITY

The electronic camera of the invention can properly display a moving image that is usable as a viewfinder.

What is claimed is;
1. An electronic camera comprising:
an image pickup section photographing an object to generate an image;
a display device displaying the image generated by the image pickup section as a moving image;
a buffer section temporarily storing therein the image generated by the image pickup section and to be displayed as a moving image on the display device;
a recording section recording thereon the image generated by the image pickup section according to a user's operation, wherein
the electronic camera further comprises a display switching section which switches a first display and a second display at a predetermined timing, the first display being for performing display of a moving image on the display device through the buffer section, the second display being for performing display of a moving image not through the buffer section;
a first operating member receiving a user's operation when pressed in two steps, the user's operation being associated with the image recording by the recording section; and
a shooting condition adjusting section performing at least one of auto exposure adjustment and autofocus until the first operating member is pressed in a first step, wherein
the display switching section performs the first display until the first operating member is pressed in the first step, and switches the first display to the second display when the first operating member is pressed in the first step.

2. The electronic camera according to claim 1, comprising:
an exposure adjusting section performing auto exposure adjustment; and
a second operating member receiving a user's operation to stop the auto exposure adjustment, wherein
the display switching section performs the first display until the user's operation to stop the auto exposure adjustment is received by the second operating member, and switches the first display to the second display when the user's operation to stop the auto exposure adjustment is received.

3. The electronic camera according to claim 1, comprising:
a focusing section performing autofocus; and
a second operating member receiving a user's operation to stop the autofocus, wherein
the display switching section performs the first display until the user's operation to stop the autofocus is received by the second operating member, and switches the first display to the second display when the user's operation to stop the autofocus is received.

4. The electronic camera according to claim 1, comprising:
an exposure adjusting section performing auto exposure adjustment;
a focusing section performing autofocus; and
a second operating member receiving a user's operation to stop the auto exposure adjustment and autofocus, wherein
the display switching section performs the first display until the user's operation to stop the auto exposure adjustment and autofocus is received by the second operating member, and switches the first display to the second display when the user's operation to stop the auto exposure adjustment and autofocus is received.

5. The electronic camera according to claim 1, wherein:
the display switching section decides whether or not to enable implementation of the second display according to a user's operation.

6. The electronic camera according to claim 1, wherein the image pickup section includes a temporary buffer for photographed images for temporarily storing therein the image obtained by the photographing and for outputting it to the buffer section.

7. The electronic camera according to claim 6, wherein the photographed images include at least a first photographed image and a second photographed image;

the temporary buffer for the photographed images includes a first temporary buffer for the first photographed image and a second temporary buffer for the second photographed image;

the buffer section includes a first display buffer and a second display buffer;

the first display being performed at a first path, the first path being a path in which a first condition and a second condition can be switched back and forth by said display switching section, the first condition being a condition which, in a first period, stores the first photographed image to the first temporary buffer, outputs the second photographed image stored in the second temporary buffer to the second display buffer, and outputs the first photographed image stored in the first display buffer to the display device, the second condition being a condition which, in a second period that is different from the first period, stores the second photographed image to the second temporary buffer, outputs the first photographed image stored in the first buffer to the first temporary display buffer, and outputs the second photographed image stored in the second display buffer to the display device; and the second display being performed at a second path, the second path being a path for storing the first photographed image to the first temporary buffer and for outputting the first photographed image stored in the first temporary buffer to the display device.

* * * * *